US010611493B2

(12) United States Patent
MacLean

(10) Patent No.: US 10,611,493 B2
(45) Date of Patent: Apr. 7, 2020

(54) ANTI-TERRORISM / ANTI-PERSONNEL MOBILE COMMERCIAL PASSENGER AIRCRAFT PHYSICAL FLIGHT DECK / COCKPIT SECONDARY BARRIER GALLEY CART / AIRCRAFT SECONDARY BARRIER CART ((ASBC)

(71) Applicant: Robert James MacLean, Leesburg, VA (US)

(72) Inventor: Robert James MacLean, Leesburg, VA (US)

(*) Notice: Subject to any disclaimer, the term of this patent is extended or adjusted under 35 U.S.C. 154(b) by 0 days.

(21) Appl. No.: 15/799,391

(22) Filed: Oct. 31, 2017

(65) Prior Publication Data
US 2018/0099762 A1    Apr. 12, 2018

(51) Int. Cl.
B64D 45/00 (2006.01)
B64C 1/14 (2006.01)

(52) U.S. Cl.
CPC ........ B64D 45/0015 (2013.01); B64C 1/1469 (2013.01)

(58) Field of Classification Search
CPC ....... B64C 1/14; B64C 1/1407; B64C 1/1415; B64C 1/1423; B64C 1/1446; B64C 1/1461; B64C 1/1469; B64C 9/00; B64C 45/0015; B64C 2045/005; E06B 9/01; E06B 9/02; E06B 9/0692; E06B 2009/002
USPC ............ 244/118.5, 121; 160/351, 354, 368.1
See application file for complete search history.

(56) References Cited

U.S. PATENT DOCUMENTS

| 4,869,445 A | * | 9/1989 | Jones | B64D 9/00 244/118.1 |
| 4,909,004 A | * | 3/1990 | Panttila | E06B 9/00 160/114 |
| 5,393,013 A | * | 2/1995 | Schneider | B64D 11/0023 160/351 |
| 5,597,028 A | * | 1/1997 | Rolf | B60J 1/2011 160/354 |
| 6,474,599 B1 | * | 11/2002 | Stomski | B64C 1/1469 109/68 |
| 6,523,779 B1 | * | 2/2003 | Michel | B64D 11/0023 244/118.5 |
| 6,588,705 B1 | * | 7/2003 | Frank | B64C 1/1469 244/118.5 |

(Continued)

OTHER PUBLICATIONS

Radio Technical Commission for Aeronautics Study from Sep. 28, 2011 entitled Aircraft Secondary Barriers and Alternative Flight Deck Security Procedures—RTCA DO-329 (Abstract Only).

Primary Examiner — Joshua E Rodden
(74) Attorney, Agent, or Firm — Steven M. War, Esq.; McNeely, Hare & War LLP

(57) ABSTRACT

The Aircraft Secondary Barrier Cart includes a main housing, with at least two retractable cables with metallic safety-hooks at the ends that connect to the two female loops behind each bulk-head. When deployed, the two cables hold the barrier cart in place. The two retractable cables are connected to a ratcheting system to stabilize and strengthen the barrier cart's stability after deployment. The ratcheting system includes a release lever to disengage the two main-housing cables before stowage. The barrier cart includes a folding-barrier with elastic and polymer safety-hooks sewn in. When the curtain or net gets expanded, its safety-hooks attach to several female loops riveted into the upper portion of the forward galley entrance.

16 Claims, 2 Drawing Sheets

(56) References Cited

U.S. PATENT DOCUMENTS

| | | | |
|---|---|---|---|
| 2003/0006342 A1* | 1/2003 | Page, Jr. | H04B 3/56 |
| | | | 244/118.5 |
| 2003/0169184 A1* | 9/2003 | Manten | B64C 1/1469 |
| | | | 340/945 |
| 2004/0094667 A1* | 5/2004 | D'Alvia | B64C 1/1469 |
| | | | 244/118.5 |
| 2004/0188565 A1* | 9/2004 | Egeresi | B60R 25/018 |
| | | | 244/118.5 |
| 2006/0000946 A1 | 1/2006 | Garofani et al. | 244/118.5 |
| 2006/0054741 A1* | 3/2006 | Mills | B64D 11/00 |
| | | | 244/118.5 |
| 2010/0219291 A1* | 9/2010 | Guering | B64C 1/22 |
| | | | 244/118.5 |
| 2011/0156439 A1* | 6/2011 | Sakata | B60N 2/3011 |
| | | | 296/182.1 |
| 2013/0139979 A1* | 6/2013 | Zheng | B60J 1/2011 |
| | | | 160/229.1 |
| 2013/0168033 A1* | 7/2013 | Dier | B61D 19/00 |
| | | | 160/354 |
| 2017/0009504 A1* | 1/2017 | Colacecchi | A47H 1/04 |
| 2017/0009518 A1* | 1/2017 | Carter | E06B 9/0692 |
| 2017/0328075 A1* | 11/2017 | Conners | E04G 21/3266 |

\* cited by examiner

ANTI-TERRORISM / ANTI-PERSONNEL MOBILE COMMERCIAL PASSENGER AIRCRAFT PHYSICAL FLIGHT DECK / COCKPIT SECONDARY BARRIER GALLEY CART / AIRCRAFT SECONDARY BARRIER CART ((ASBC)

Solo suicidal terrorist attacks, also known as "lone-wolf attacks," are becoming more common daily. "Lone-wolf attacks" are delivered by such means as Improvised Explosive Devices (IED) worn on the body or contained in a vehicle, or driving a speeding vehicle into a crowd of victims.

Suicidal "lone-wolf attacks" on commercial passenger aircraft (aircraft) are a very real threat because of the inability of detection by airport security screening machines, airport screeners, law enforcement, and the Intelligence Community. Firearms pose less of a threat because of their detectable metallic parts, the fear of extinguishing all ammunition and being restrained, and the limited killing ability—a standard semiautomatic pistol's 18 rounds cannot neutralize a single-aisle aircraft of over 100 passengers. Building, hiding, and smuggling IEDs requires special material, numerous experts, and planning—such a major operation and its operatives are likely to be detected.

After the Sep. 11, 2001 terrorist attacks (9/11), a pilot will not risk total destruction of the aircraft by unlocking the Flight Deck under duress.

Sprinting and diving into a Flight Deck, also known as a "cockpit," only needs one attacker and one opportunity when a pilot enters the cabin during flight to use the lavatory, obtain sustenance, or crew-rest.

This perfectly effective inflight security invention is a relatively inexpensive mobile commercial passenger aircraft galley cart physical secondary barrier to stop an individual from sprinting and diving into an unlocked flight deck in order to destroy the aircraft during flight.

TECHNICAL FIELD

Currently most commercial passenger aircraft (aircraft) do not have a secondary barrier system to prevent an individual from sprinting and diving into the Flight Deck during flight.

BACKGROUND ART

NOT APPLICABLE

SUMMARY OF INVENTION

A mobile secondary barrier system to prevent an individual from sprinting and diving into a commercial passenger aircraft Flight Deck in order to destroy the aircraft while in flight.

Technical Problem

Most commercial passenger aircraft do not have a secondary barrier system to prevent an individual from sprinting and diving into a Flight Deck in order to destroy the aircraft while in flight.

Despite 9/11, air carriers do not build Flight Deck secondary barriers into the vast majority of newly manufactured aircraft. Until there is a regulatory or legal mandate to build barriers into brand new cabins, thousands of existing aircraft cannot be cost effectively retrofitted.

A Flight Deck secondary barrier is needed to stop an attacking individual for at least five seconds so that a pilot can close the Flight Deck door and emergency land the aircraft. Due to 9/11, all Flight Deck doors can withstand—a strong individual trying to break it down—long enough to emergency land.

Inward-opening Flight Deck doors are exceptionally more vulnerable to an attack because the door swings against a pilot the moment he/she opens it. An attack on an outward-opening door gives a crew member the chance to use his/her backside to close it in which the frame reinforces the door. An attack on an outward-opening doored Flight Deck requires the attacker to have to wedge himself between the door and the frame if he cannot dive into the Flight Deck semi-impeded or unimpeded. Only spring-latches protect Flight Decks with an inward-opening door. There are approximately 1,187 existing aircraft with inward-opening doors.

Most aircraft that fly over large bodies of water are wide-body (two aisles). It is more difficult to attack the Flight Deck on a wide-body aircraft than a single-aisle one due to the extra distance between the Flight Deck entrance and the first row in the cabin.

The existing Garofani Installed Physical Secondary Barrier (GGIPSB) system (Patent Publication No. US20060000946—Inventors Primo, Dante, and Renato Garofani) is expensive to manufacture, install, and maintain due to its relatively excessive weight and bulkiness, and the fact it has to be built into the aircraft.

The GIPSB is installed in the busiest choke-point of the aircraft: to the right of the main aircraft entry door and inside of the forward galley entrance.

Once the GIPSB has been installed, it gets degraded after being subjected to usage during DT deployments. The GIPSB stows into the forward galley entrance causing it to protrude into the aisle hence causing it to be exposed to all of the passengers, luggage, and galley carts. Due to it being in the busiest transit area of the aircraft, the GIPSB also gets damaged by passengers accidentally hitting it with their carry-on luggage or the flight crew running into it with sustenance galley carts.

An inoperable GIPSB not only leaves the aircraft vulnerable to destruction, but it takes the aircraft out of service for an extended duration: While an GIPSB maintenance order is drafted and transmitted by an aircrew member, an GIPSB technician gets dispatched, a technician assesses the damage, a technician orders the GIPSB parts, the parts may have to be manufactured if not in stock, and finally, the time it takes to repair and/or replace the GIPSB. Because the GIPSB has to be glued, riveted, or screwed into the aircraft cabin, there also exists the potential of damage to the cabin which would also need repair.

An inoperable GIPSB takes an aircraft temporarily out of service and reduces air carriers' profits.

Another danger posed the GIPSB's very large main-housing attached to the cabin can collapse during severe turbulence or a hard-landing and prevent emergency egress through the aircraft's main choke-point and exit.

Most aircraft rely on the current inferior method of a flight attendant standing in front of the Flight Deck door with or without a standard sustenance galley cart in front of him/her. There is also a reliance of government air marshals who are rarely on flights and when they are aboard, they cannot respond fast enough to an attacker sprinting and diving into the Flight Deck.

Between 2009 and 2011, the volunteer, non-profit organization, "Radio Technical Commission for Aeronautics"

(RTCA) conducted a study and issued a report on Sep. 28, 2011 titled, "Aircraft Secondary Barriers and Alternative Flight Deck Security Procedures (RTCA DO-329)."

RTCA DO-329 concluded that not having a secondary barrier physically mounted or mechanically attached to the cabin could result in an attacker crashing an aircraft. The method of an aircrew member standing in front of a standard sustenance galley cart or no cart was defeated by padded-up role players who were likely unwilling to attack a simulated flight deck at full speed and strength and subject themselves to injury. The role-player U.S. Department of Homeland Security/Transportation Security Administration (TSA)/ Federal Air Marshal Service (FAMS) Federal Air Marshals (FAM) also anticipated a sprint-dive-attack. FAMs in a real world scenario are subjected to cabin noise, seat-belted, distracted with reading or watching video, or are taking an authorized nap.

The results of RTCA DO-329 were so disturbing, the TSA and the U.S. Department of Transportation/Federal Aviation Administration redacted the report and marked it as "SENSITIVE SECURITY INFORMATION."

Until Mar. 2, 2016, the unredacted RTCA DO-329 was withheld from TSA-FAMS Supervisory Federal Air Marshals in charge of field offices' training divisions, TSAFAMS trainers, and rank-and-file TSA FAMs who routinely fly protective missions while armed with firearms.

Four of the five role-player FAMs in the RTCA DO-329 study are supervisory or managerial FAMs, some of whom have since been promoted.

While the RTCA DO-329 invited air carrier representatives, and pilots and flight attendants union representatives, it did not invite any professional law enforcement non-union organizations who lobby on behalf of FAMs. Such organizations are the Fraternal Order of Police, the Federal Law Enforcement Officers Association, and the Air Marshal Association. FAMs cannot form common bargaining-unit unions that have contracts with U.S. Government agency senior leadership.

Due to human error, sometimes pilots exit and enter the Flight Deck without establishing any type of human or combination of human and standard sustenance galley cart barrier.

The RTCA DO-329 study concluded that an installed physical secondary barrier needs to only stop an attacker for at least five seconds so that a pilot can lock the reinforced Flight Deck door, begin emergency landing, and potentially armed himself/herself with a Federal Flight Deck Officer firearm in its locked container in the case the attacker breaches both the barrier and the door.

Solution to Problem

Anti-Terrorist Anti-Personnel Mobile Commercial Passenger Aircraft Physical Secondary Barrier Forward Galley Cart—Aircraft-Secondary-Barrier-Cart (ASBC) is 100% effective in stopping an attack on the Flight Deck and is exceptionally more inexpensive than the GIPSB.

As proven by the RTCA DO-329 study, a Flight Deck installed physical secondary barrier does not need to be impenetrable, it only needs to stop an attacker for at least five seconds which is long enough for the pilot to lock the reinforced Flight Deck door and quickly emergency land. If the attacker breaks down the ASBC and the reinforced Flight Deck door, enough time will have elapsed for the pilot to unlock a Federal Flight Deck Officer firearm's container, load it with ammunition, and have it ready for a Flight Deck breach.

The ASBC looks very similar to a sustenance galley cart except that it locks into the forward galley entrance, its top opens, inside is an expandable rigid or fabric/net barrier, the barrier then can be folded out (rigid) and/or hooked around (fabric/net) the top portion of the forward galley entrance.

A fabric/net barrier is more advantageous to a rigid one to its light weight and ability to easily see an imminent attack through it. A rigid barrier would need to be clear plexiglass or require a peep-hole.

The ASBC transforms into a commercial aircraft forward galley entrance physical secondary barrier that can instantly be replaced after landing if it malfunctions. The ASBC will not only save on government armed air marshal deployment costs, but will 100% eliminate the danger to aircraft flight decks—also known as cockpits—during inflight Flight Deck entries or exits during flight. The dividend would also substantiate allowing more FAMs to detect "lone-wolf attackers," and conduct IED prevention, counterterrorism, and insider—threat search activities in our mass-transit centers.

Advantageous Effects of Invention

The ASBC system is considerably less expensive than the GIPSB's for the fact the cabin would only need a tiny alteration: the two small loops installed into the galley entrance to lock the ASBC into place, and the three loops to hook a fabric net into the cabin ceiling.

Maintenance of the ASBC saves air carrier costs because it can be instantly replaced after landing without a technician, parts order, cabin repair, and the time needed to repair or replace a damaged or inoperable GIPSB.

Due to the GIPSB over-engineering, i.e. retractable cables and female/male locking mechanisms, air turbulence could also cause it to become inoperable during flight.

Due to an GIPSB being in the area of the highest passenger, carry-on luggage, and sustenance galley cart traffic that could accidentally damage and render it inoperable, it presents a vulnerability to the Flight Deck due to the fact it cannot be repaired or replaced until after landing.

The ASBC is stowed in the forward galley and cannot be damaged by passenger and equipment traffic.

Premeditating his attack, an attacker can chemically (glue) or mechanically sabotage an GIPSB while crew members and passengers are distracted, or when cabin lights are dimmed or off. Such an opportunity is likely while the attacker stands next to the GIPSB waiting to use the lavatory inside of the forward galley.

Figure 1:
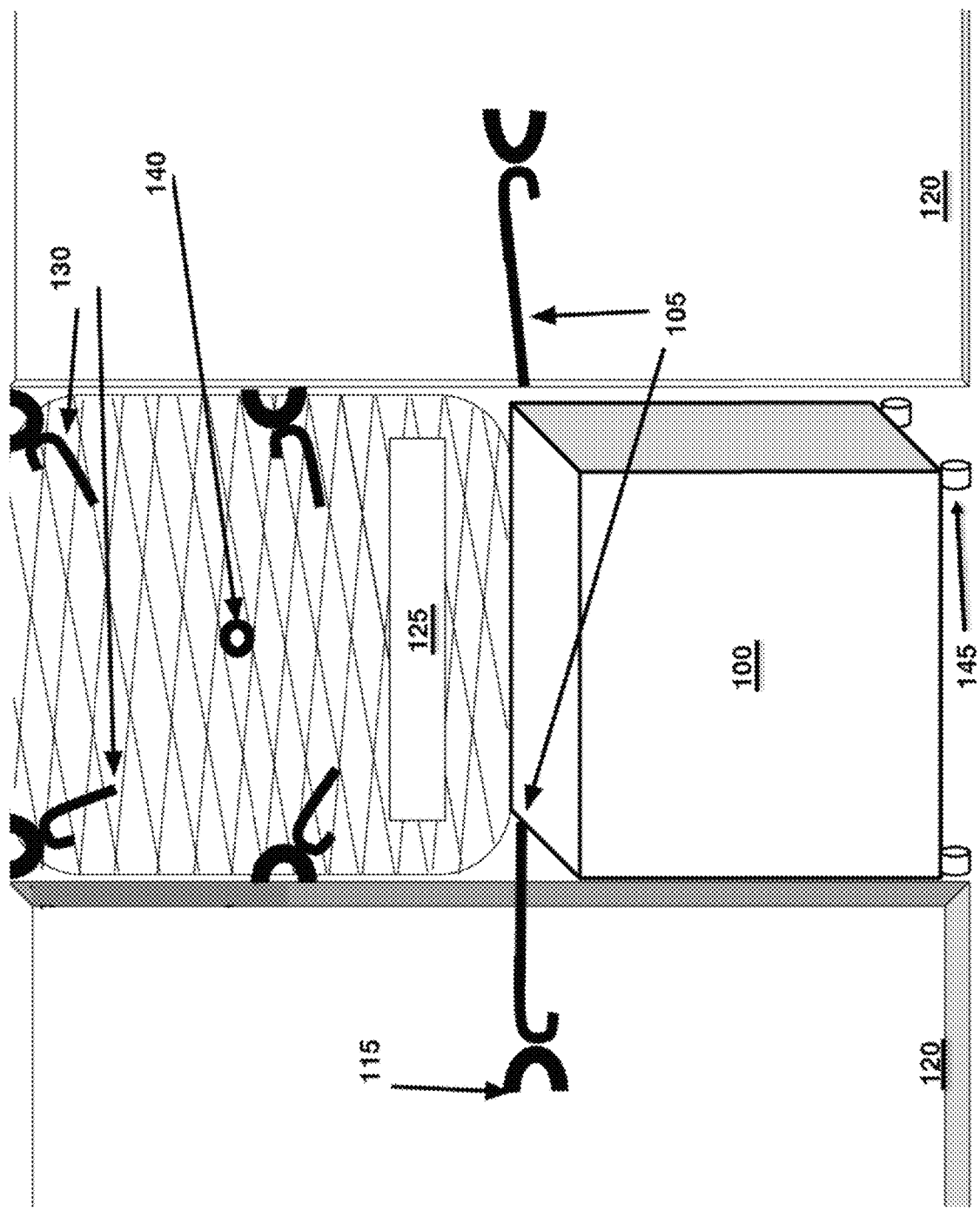
FIG. 1 shows the ASBC's main-housing, as seen from the main cabin, which can be an oval cylinder or rectangular box on wheels with a hinged lid to top that folds toward the Flight Deck when deployed.

On the side that faces the Flight Deck when it is deployed, the Aircraft Secondary Barrier Cart (ASBC)'s main-housing 100 has two retractable cables 105 with metallic safety-hooks 110 at the ends that connect to the two female loops 115 behind each bulk-head 120 on each side of the ASBC. Once the two retractable cables 105 are deployed, it becomes more difficult for an attacker to tip the ASBC 100 over like a standard sustenance galley carts used for the current method. The female loops 115 may be spring-loaded recessed D-rings and are used for connecting the ratcheting system cables. Preferably two female loops 115 would be located inside the galley. The retractable cables 105 are ratcheting system stretching steel cables with safety-hooks 110 and are located inside the galley.

The two ASBC retractable (main-housing) cables have a ratcheting system 205 (FIG. 2) in order to stabilize and strengthen the ASBC's stability after deployment. The ratcheting system 205 is on the backside of the ASBC facing the Right Deck. The ratcheting system 205 has a release lever to disengage the ASBC's two main-housing cables before stowage.

Figure 2:
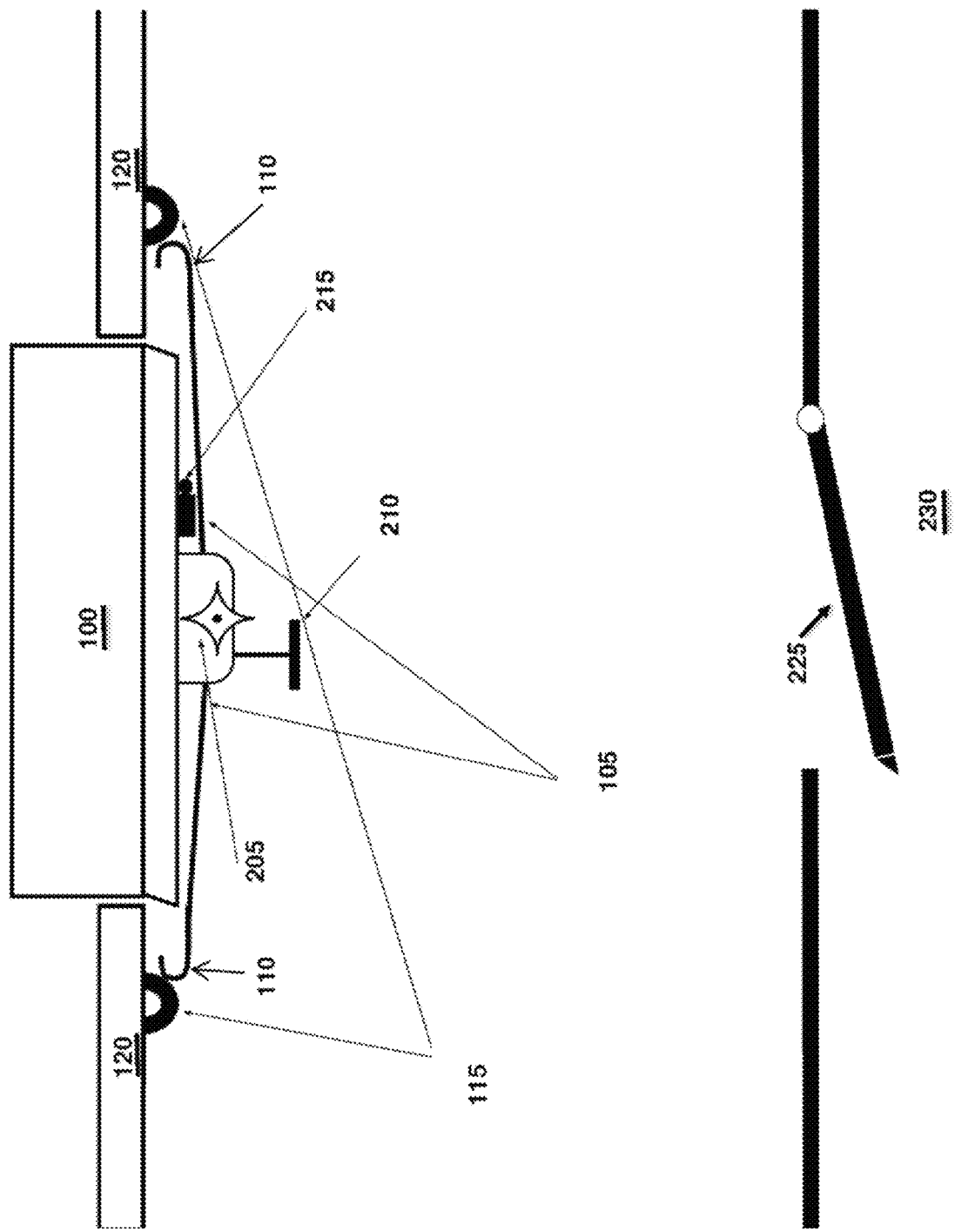
FIG. 2 shows an aerial view of the ASBC's main-housing constructed of a combination of steel, high-grade polymer, ahoy, and carbon-fiber.

In the case that the ratcheting system 205 malfunctions and cannot be disengaged, an emergency "T"-handle Hex Key tool 210 is attached to the Flight Deck door side of the ASBC's main-housing and can be used to release the ratcheting system's locking mechanism, FIG. 2 shows the Emergency Release Hex Key 210 in an "engaged" position.

The ratcheting system 205 should be concave for easier stowage. FIG. 2 (the aerial view drawing) reflects a convex system for easier comprehension.

Inside of the ASBC 100 is an attached folding-barrier 125 made of steel, alloy, ceramic, carbon fiber, polymer, clear plexiglass, or a cloth-type curtain or a cloth-type net; the folded barrier 125 may be a combination of the aforementioned materials.

If the ASBC's folding-barrier 125 is made of a cloth-like curtain or net, it has elastic and polymer safety-hooks 130 sewn in. When the curtain or net 125 gets expanded, its safety-hooks 130 attach to several female loops 135 riveted into the upper portion of the forward galley entrance. The female loops may be spring-loaded recessed D-rings. The rigid version of the folding-barrier 125 includes a peep-hole 140.

A cloth-like folding-barrier has drawstrings that can be pulled to stiffen the ASBC's 100 barrier.

A rigid ASBC folding-barrier 125 has to be tall enough to prevent an attacker from diving over it and into an unlocked Right Deck. On the bottom of the ASBC 100 wheels 145 are included to easily move the ASBC 100.

An air carrier has the option to request that the ASBC's folding-barrier 125 be projectile-proof from firearms or an IED.

Due to the numerous different types of aircraft and cabin configurations, the size of the ASBC's main-housing and folding-barriers vary.

The ASBC 100 main-housing's height should be a minimum of 100 cm and width of 25 cm.

The ASBC 100 has a panic-button covered with a protective hinged cover 215. The panic-button would allow a crewmember to engage a very loud electronic alarm so that the pilot can lock the Right Deck and emergency land.

The aerial view of the ASBC 100 (FIG. 2) shows the positioning of the ASBC 100 between the main passenger cabin and the forward galley area 220 so that the ASBC 100 is positioned in front of the flight deck door 225 (FIG. 2 shows an inward facing flight deck door) which leads to the flight deck 230.

INDUSTRIAL APPLICABILITY

Commercial Passenger Aircraft

The invention claimed is:

1. A Mobile Aircraft Secondary Barrier System comprising:
   a main housing being in the form of a barrier cart;
   at least two retractable cables attached to said main housing and configured to attach to at least two points on an aircraft;
   at least one ratcheting system configured to hold said main housing in place;
   a release lever configured to disengage the at least two retractable cables from said aircraft;
   a curtain barrier designed to increase a height of the main housing when deployed; and
   at least two safety hooks attached to said curtain barrier configured to hold said curtain barrier in place.

2. The Mobile Aircraft Secondary Barrier System of claim 1 wherein said curtain barrier is projectile proof.

3. The Mobile Aircraft Secondary Barrier System of claim 1 wherein said curtain barrier is rigid.

4. The Mobile Aircraft Secondary Barrier System of claim 3 further including a peep hole located in said rigid curtain barrier.

5. The Mobile Aircraft Secondary Barrier System of claim 1 further including an emergency release device.

6. The Mobile Aircraft Secondary Barrier System of claim 1 wherein said ratcheting system is configured to tighten said retractable cables to hold said main housing in place.

7. The Mobile Aircraft Secondary Barrier System of claim 1 further including a panic button.

8. A Cockpit Secondary Barrier System comprising of:
   a mobile Aircraft Secondary Barrier Cart positioned between a main passenger cabin and a flight deck door wherein said mobile Aircraft Secondary Barrier Cart is affixed to bulkheads of an aircraft by means of at least two retractable cables wherein said at least two retractable cables are tightened by a ratcheting system, a curtain barrier attached to said mobile Aircraft Secondary Barrier Cart wherein said curtain barrier is attached to said aircraft by means of at least two sewn-in net safety hooks affixed to said bulkheads.

9. The Cockpit Secondary Barrier System of claim 8 wherein said curtain barrier is projectile proof.

10. The Cockpit Secondary Barrier System of claim 8 wherein said curtain barrier is rigid.

11. The Cockpit Secondary Barrier System of claim 10 further including a peep hole located in said rigid curtain barrier.

12. The Cockpit Secondary Barrier System of claim 8 further including an emergency release device.

13. The Cockpit Secondary Barrier System of claim 8 further including a panic button.

14. A method of securing a Flight Deck of an aircraft comprising the steps of:
   positioning an Aircraft Secondary Barrier Cart in between two bulkheads of the aircraft wherein said two bulkheads are located between a main passenger cabin and the flight deck;
   securing said Aircraft Secondary Barrier Cart in place by attaching two retractable cables securely affixed to said Aircraft Secondary Barrier Cart to said two bulkheads; and
   securing a curtain barrier which is attached to said Aircraft Secondary Barrier Cart to said two bulkheads.

15. The method of claim 14 wherein the step of securing said Aircraft Secondary Barrier Cart to two bulkheads is performed by tightening a first ratcheting system.

16. The method of claim 14 wherein the step of securing said curtain barrier to two bulkheads is performed by sewn-in net safety hooks affixed to said bulkheads.

* * * * *